(12) United States Patent
Rossman

(10) Patent No.: US 10,050,999 B1
(45) Date of Patent: Aug. 14, 2018

(54) SECURITY THREAT BASED AUTO SCALING

(71) Applicant: Amazon Technologies, Inc., Seattle, WA (US)

(72) Inventor: Hart Matthew Rossman, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 62 days.

(21) Appl. No.: 14/862,052

(22) Filed: Sep. 22, 2015

(51) Int. Cl.
*H04L 29/06* (2006.01)
*H04L 12/923* (2013.01)

(52) U.S. Cl.
CPC ........ *H04L 63/1466* (2013.01); *H04L 47/762* (2013.01); *H04L 63/1416* (2013.01)

(58) Field of Classification Search
CPC .......... H04L 63/1466; H04L 63/1416; H04L 47/762
See application file for complete search history.

(56) References Cited

U.S. PATENT DOCUMENTS

| 7,865,954 | B1* | 1/2011 | Phoha | H04L 63/1466 709/224 |
| 9,432,335 | B1* | 8/2016 | Stevenson | H04L 63/0209 |
| 2004/0003286 | A1* | 1/2004 | Kaler | G06F 21/554 726/25 |
| 2005/0091513 | A1* | 4/2005 | Mitomo | H04L 63/10 713/188 |
| 2005/0132060 | A1* | 6/2005 | Mo | H04L 51/12 709/227 |
| 2010/0082513 | A1* | 4/2010 | Liu | H04L 63/1458 706/46 |
| 2011/0093413 | A1* | 4/2011 | Calcaterra | G06F 11/3409 706/11 |
| 2014/0082730 | A1* | 3/2014 | Vashist | H04L 63/1416 726/23 |
| 2015/0163242 | A1* | 6/2015 | Laidlaw | G06F 21/552 726/22 |
| 2016/0210172 | A1* | 7/2016 | Ramachandra | G06F 9/5072 |
| 2016/0323301 | A1* | 11/2016 | Boss | H04L 63/1416 |
| 2016/0335111 | A1* | 11/2016 | Bruun | G06F 9/45558 |
| 2016/0371105 | A1* | 12/2016 | Sieffert | G06F 8/67 |

* cited by examiner

*Primary Examiner* — Saleh Najjar
*Assistant Examiner* — Louis C Teng
(74) *Attorney, Agent, or Firm* — Thorpe North & Western LLP

(57) ABSTRACT

Technology is described for auto scaling computing resources in response to a cyber-attack in a service provider environment. The computing resources in the service provider environment may be detected as being exposed to the cyber-attack. A security scaling action may be performed in the service provider environment that mitigates the cyber-attack. The security scaling action to be performed may be determined by a security threat mitigation service that operates in the service provider environment. A performance of the security scaling action in the service provider environment may be initiated.

19 Claims, 9 Drawing Sheets

US 10,050,999 B1

SECURITY THREAT BASED AUTO SCALING

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

These virtual computing systems offer end users access to processing and information of many types on a global basis. With the proliferation of wireless communication and global computer networks, malicious individuals can access these computer networks which are hosting virtualized computing resources from practically anywhere. Extensive computer network connectivity has magnified the ability of malicious individual to perform computer attacks (e.g., distributed denial of service, viral, and malware attacks). Computer attacks have a devastating impact on computer systems worldwide in terms of costs, productivity loss and data privacy. Given the increasing use of virtualized technology and sharing of physical computing resources amongst multiple customers, the ability to protect virtualized computing resources and storage resources from computer attacks is valuable.

DETAILED DESCRIPTION

Figure 1:
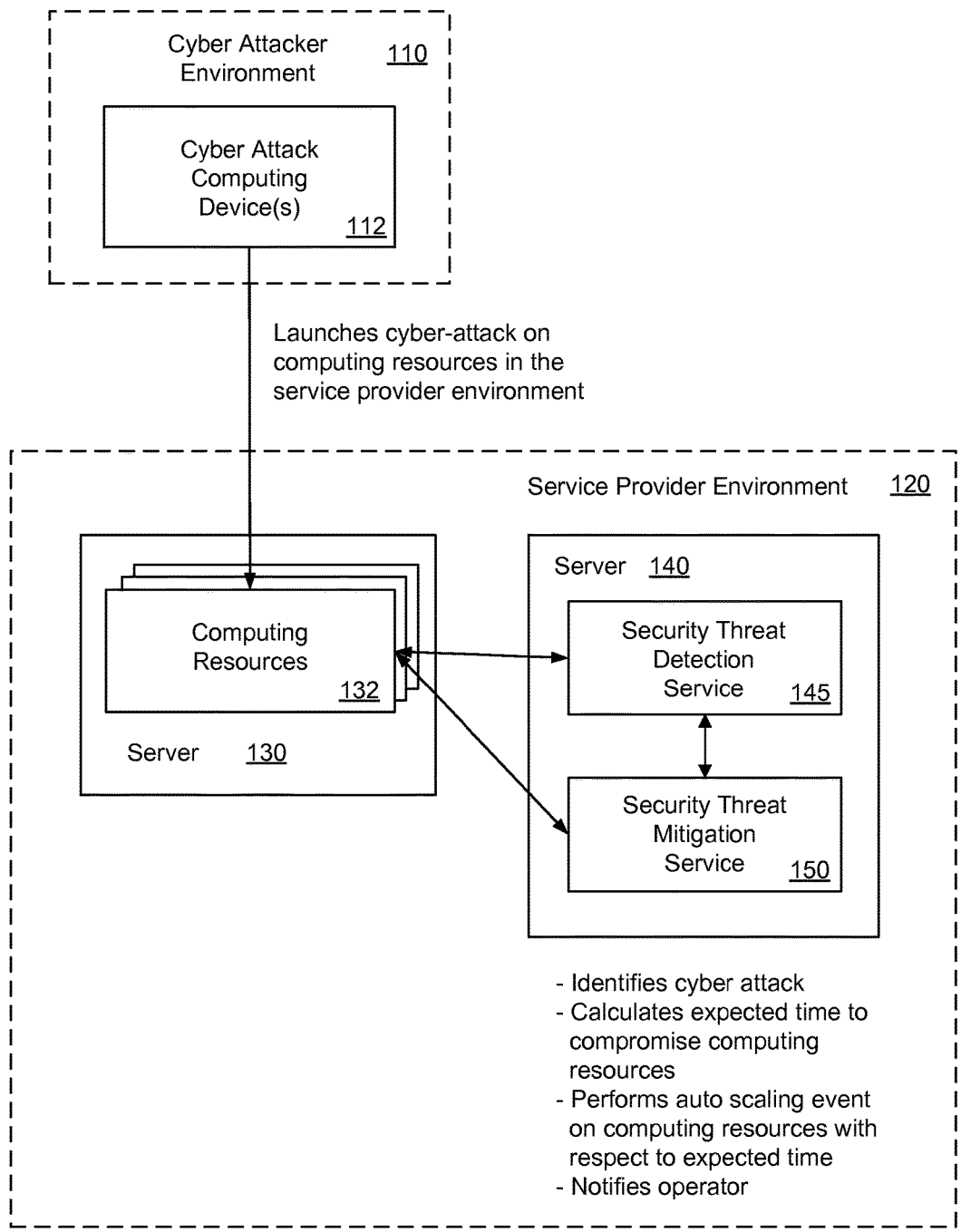
FIG. 1 illustrates a system and related operations for auto scaling computing resources in response to a cyber-attack in a service provider environment according to an example of the present technology.

A technology is described for auto scaling computing resources in response to a cyber-attack in a service provider environment. The computing resources that are being subjected to the cyber-attack may be identified, for example, by a security threat mitigation service that operates in the service provider environment. The computing resources that are being attacked may be a particular class of computing resources, such as computing resources, storage resources, network resources, data store resources, etc. The security threat mitigation service may perform any one of a number of auto scaling events on the computing resources in order to mitigate the cyber-attack, such as auto scaling out the computing resources (i.e., adding computing resources) or auto scaling in the computing resources (i.e., removing computing resources).

In one example, the security threat mitigation service may calculate an expected amount of time before the computing resources become compromised due to the cyber-attack. The expected amount of time may also be referred to as a "time to defeat" or overwhelm the particular computing resources in the service provider environment that are being attacked. The security threat mitigation service may calculate the expected amount of time based on a type of cyber-attack, the class of computing resource that is being subjected to the cyber-attack and/or a type of computing resource configuration in the service provider environment. For example, a security threat mitigation service may determine that the expected time to compromise a computing instance using a SQL (structured query language) injection attack is five minutes but a denial of service attack may take one minute. In other words, the expected amount of time may vary depending on the type of cyber-attack and whether the computing resources being attacked are storage, network interface cards, etc.

In addition, the security threat mitigation service may calculate the expected amount of time before the computing resources become compromised based on an attack vector and/or attack velocity associated with the cyber-attacker. If the cyber attacker is attacking the computing resources at an increased rate, then the expected amount of time until the computing resources become compromised is reduced. Based on the attack vector, the security threat mitigation service may predict which computing resources are likely to be attacked in the future, and then determine which security scaling actions are to be performed in order to mitigate the cyber-attack.

The security threat mitigation service may select an auto scaling event to perform on the computing resources in order to mitigate the cyber-attack. The auto scaling event may be selected such that an amount of time to perform the selected auto scaling event is less than the expected amount of time before the computing resources become compromised. In other words, the auto scaling event may be performed before the computing resources are overwhelmed due to the cyber-attack. In one example, the auto scaling event may include scaling out the computing resources and providing additional computing power (e.g., additional compute cycles) to cause the computing resources to not be compromised in the expected amount of time. In addition, by scaling out the computing resources and mitigating the cyber-attack, the cyber attacker's cost to continue carrying out the cyber-attack may accumulate over time. After a defined period of time, the cyber attacker may expend their available resources and stop performing the cyber-attack.

In one example, the auto scaling event may be unable to be performed in an amount of time that is less than the expected amount of time before the computing resources become compromised. In this case, the security threat mitigation service may notify an operator or change a security group to block the cyber-attacker. In general, blocking the cyber attacker may be performed in less time as compared to performing the auto scaling event.

In another example, the auto scaling event may include auto scaling in the computing resources in order to reduce an attack surface in the service provider environment. For example, the number of computing instances that are being executed for a specific task may be reduced. By minimizing the attack surface, the security threat mitigation service may create a choke point in the service provider environment that enables capture of a cyber-attacker (e.g., capturing the identity or source location of the cyber-attacker) or blocking access to the cyber-attacker. In this example, the computing resources that are auto scaled in may become compromised by the cyber-attacker, which may increase a dwell time of the cyber-attacker in the service provider environment. The dwell time may refer to a period of time during which the cyber-attacker remains in the service provider environment after overwhelming the computing resources in the service provider environment. However, the security threat mitigation service may permit the computing resources to be compromised in order to increase a probability of capturing the cyber-attacker. Capturing the cyber-attacker may involve determining an identity of the cyber-attacker or a source location of the cyber-attack.

In one example, the security threat mitigation service may determine the type of security scaling action to perform (e.g., auto scale out the computing resources, auto scale in the computing resources) based on heuristic scaling rules. Other examples of the security scaling actions may include adding a firewall layer, adding a honeypot layer, adding a reverse proxy layer, etc. The heuristic scaling rules may be defined by a customer associated with the computing resources in the service provider environment. For instance, the heuristic scaling rules may indicate a cyber-attack mitigation strategy of mitigating the cyber-attack as soon as possible, in which case the computing resources under attack may be auto scaled out in accordance with the heuristic scaling rules. Alternatively, the heuristic scaling rules may indicate a cyber-attack mitigation strategy of capturing the cyber-attacker (e.g. focusing the cyber-attacker into one computing instance that is compromised), in which case the computing resource under attack may be scaled in based on the heuristic scaling rules. Therefore, based on the heuristic scaling rules, the security threat mitigation service may perform an appropriate security scaling action when the computing resources are attacked in the service provider environment.

In one example, after the heuristic scaling rule is applied and the auto scaling event is performed on the computing resources, the security threat mitigation service may recalculate the expected amount of time before the computing resources become compromised due to the cyber-attack. The security threat mitigation service may determine whether the recalculated expected amount of time is within an acceptable range, and if so, the security threat mitigation service may not perform additional auto scaling events. If the security threat mitigation service determines that the recalculated expected amount of time is not within the acceptable range, then the security threat mitigation service may select additional auto scaling events to perform, such that the expected amount of time falls within the acceptable range.

As a non-limiting example, the security threat mitigation service may identify a denial-of-service attack on a network interface card (NIC) in the service provider environment. The security threat mitigation service may determine that the NIC will become compromised or overwhelmed after a certain amount of data ingest throughput, such as an ingestion of 1000 packets in a time frame of 0.5 milliseconds (MS). In one example, based on the heuristic scaling rules, the security threat mitigation service may combat the denial-of-service attack by adding 50 additional computing instances, thereby adding 50 NICs. The amount of time to add the 50 additional computing instances may be 0.3 seconds, so therefore, the 50 additional computing instances may be added before the NIC is overwhelmed by the ingestion of data packets. In an alternative example, based on the heuristic scaling rules, the security threat mitigation service may reduce a number of existing computing instances to a single computing instance, thereby resulting in a single NIC. In this case, the NIC may be subjected to a pin-point attack, rather than a denial-of-service attack, so an attack surface may be reduced by auto scaling in the computing instances. By auto scaling in the computing resources, a choke point may be created to enable capture of the cyber-attacker in the service provider environment. When the cyber-attack mitigation strategy is to capture the cyber-attacker, performing a reconnaissance scan on a single NIC may consume less time and resources as opposed to performing the reconnaissance scan on 50 NICs. Therefore, depending on the strategy to combat the cyber-attack, as outlined in the heuristic scaling rules, the security threat mitigation service may determine to auto scale in or auto scale out the NICs.

As another non-limiting example, the security threat mitigation service may detect a cyber-attack, and in response, the security threat mitigation service may add a web application firewall (WAF) layer to mitigate the cyber-attack. Based on the addition of the WAF layer, the security threat mitigation service may detect that the expected amount of time before the computing resources become comprises increases from 9 minutes to 13 minutes. In one example, the security threat mitigation service may determine that an expected time of 13 minutes is within an acceptable range, and the security threat mitigation service may determine to not perform additional security scaling events in the service provider environment. In another example, the security threat mitigation service may determine that the expected time has to increase to 17 minutes in order to be within the acceptable range, and therefore, the security threat mitigation service may determine to add 20 additional computing instances.

In one example, the cyber-attack and the various security scaling actions that are performed in response to the cyber-attack may comprise of a series of events that occur in the service provider environment. The security threat mitigation service may select particular security scaling actions to perform based on the actions of the cyber-attacker. As an example, the security threat mitigation service may add a honey pot layer in response to the cyber-attack on the computing resources, which may increase the expected time to compromise the computing resources to an acceptable level. If the cyber-attacker does not change a cyber-attack pattern or strategy based on the addition of the honeypot layer, then the security threat mitigation service may not perform additional auto scaling events. However, if the cyber attacker does change the attack pattern or attack vector, then the security threat mitigation service may recalculate the expected amount of time, and then select additional auto scaling events (e.g., adding a firewall) in addition to the honeypot layer in order to reduce the expected amount of time into the acceptable range.

FIG. 1 illustrates an exemplary system for auto scaling computing resources 132 in response to a cyber-attack in a service provider environment 120. The computing resources 132 may operate on a server 130 in the service provider environment 120. The computing resources 132 may include classes of computing resources, such as computing resources, storage resources, network resources, data store resources, etc. The cyber-attack may be launched from one or more cyber-attack computing devices 112 that operate in a cyber-attacker environment 110 or network. A security threat detection service 145 may detect the cyber-attack that is launched on the computing resources 132. The security threat detection service 145 may detect the cyber-attack using machine learning or heuristic rules to track communications to a customer's environment in the service provider environment 120 to identify packet patterns and attack signatures. In addition, the security threat detection service 145 may identify the attack signatures by performing deep packet inspection of the communications to the customer's environment in the service provider environment 120. The security threat detection service 145 may notify a security threat mitigation service 150 of the computing resources 132 under attack. More specifically, the security threat detection service 145 may provide a notification outlining the type of cyber-attack and a class of computing resources 132 that are under attack. The security threat detection service 145 and the security threat mitigation service 150 may operate on a server 140 in the service provider environment 120.

The security threat mitigation service 150 may identify the computing resources 132 that are being subjected to the cyber-attack. Based on the type of cyber-attack and the class of computing resources 132 that are under attack, the security threat mitigation service 150 may calculate an expected amount of time before the computing resources 132 become compromised due to the cyber-attack. The security threat mitigation service 150 may select an auto scaling event that is capable of being performed before the computing resources 132 become compromised due to the cyber-attack. For example, the security threat mitigation service 150 may auto scale out the computing resources 132 in order to mitigate the cyber-attack, such that the computing resources 132 do not become compromised in the expected amount of time. In addition, the security threat mitigation service 150 may notify an operator or administrator about the cyber-attack. The notification may include the class of computing resources that were attacked, the auto scaling event selected to mitigate the cyber-attack, etc. The security threat mitigation service 150 may send the notification to the operator via a message queuing service that operates in the service provider environment 120.

As a non-limiting example, a load balancer in the service provider environment 120 may be subjected to the cyber-attack. The security threat mitigation service 150 may calculate that the load balancer will be overwhelmed in approximately 30 seconds after the cyber-attack is launched on the load balancer. The security threat mitigation service 150 may determine that auto scaling out the load balancer will take approximately 20 seconds. Therefore, after the security threat mitigation service 150 learns of the ongoing cyber-attack, the security threat mitigation service 150 may begin auto scaling out the load balancer, such that the load balancer will be auto scaled out prior to the load balancer being overwhelmed due to the cyber-attack. The scaling out of the load balancer may include adding additional parallel load balancer nodes or the scaling out of the load balancer may include adding additional computing power (e.g., adding additional processor cores or processing speed) to the load balancer. In addition, the security threat mitigation service 150 may determine that notifying the operator of the cyber-attack will take approximately 10 seconds. The security threat mitigation service 150 may begin auto scaling out the load balancer in parallel with notifying the operator of the cyber-attack. In this example, the security threat mitigation service 150 may select an auto scaling event that is capable of being performed before the load balancer is overwhelmed due to the cyber-attack. If the security threat mitigation service 150 cannot auto scale out the load balancer in less than 30 seconds, then the security threat mitigation service 150 may determine an alternative auto scaling event to perform in order to combat the cyber-attack.

Figure 2:
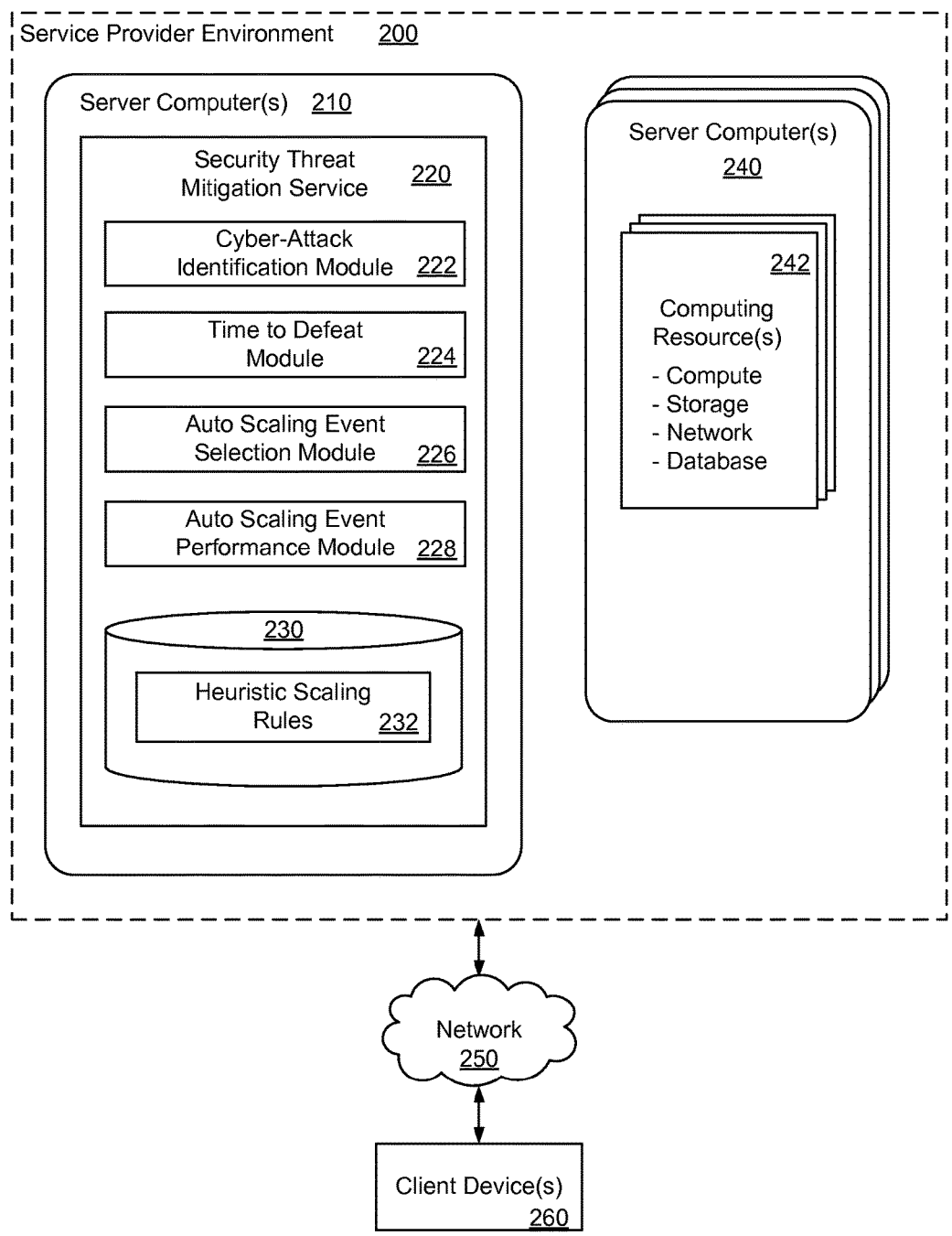
FIG. 2 is an illustration of a networked system for auto scaling computing resources in response to a cyber-attack in a service provider environment according to an example of the present technology.

FIG. 2 illustrates components of an example service provider environment 200 according to one example of the present technology. The service provider environment 200 may include a server computer 210 in communication with a number of client devices 260 via a network 250. The server computer 210 may operate a security threat mitigation service 220. The server computer 210 may contain a data store 230 and a number of modules to auto scale computing resources 242 in response to a cyber-attack in the service provider environment 200. In addition, the service provider environment 200 may include a number of server computers 240 that are running the computing resources 242. The computing resources 242 may include virtualized computing resources or physical computing resources. For example, the computing resources 242 may include computing instances, such as compute resources, storage resources, network resources, security resources, administrative resources, and/or data store resources. The server computers 240 may communicate using a virtual network that is an overlay on an actual computing service network. In one configuration, the security threat mitigation service 220 and the computing resources 242 may operate on the same server instead of on separate servers.

The data stored in the data store 230 may include heuristic scaling rules 232. The heuristic scaling rules 232 may define a cyber-attack mitigation strategy and the types of security scaling actions to perform when the computing resources 242 are subjected to the cyber-attack in the service provider environment 200. The heuristic scaling rules 232 may define distinct cyber-attack mitigation strategies depending on the type of cyber-attack that is inflicted on the service provider environment 200. In one example, the heuristic scaling rules 232 may indicate to auto scale out the computing resources 242 when the cyber-attack mitigation strategy is to mitigate the cyber-attack as soon as possible. The heuristic scaling rules 232 may indicate to add a particular type of security layer (e.g., a layer of Bastion hosts or firewalls), add a reverse proxy, etc. when the cyber-attack mitigation strategy is to mitigate the cyber-attack as soon as possible.

In addition, the heuristic scaling rules 232 may indicate to keep a dwell time of the cyber-attacker to a minimum when the cyber-attack mitigation strategy is to mitigate the cyber-attack as soon as possible. In another example, the heuristic scaling rules 232 may indicate to auto scale in the computing resources 242 when the cyber-attack mitigation strategy is to trap and capture the cyber-attacker (e.g., the identity or source location of the cyber-attacker may be captured). In this case, the heuristic scaling rules 232 may indicate to increase the dwell time of the cyber-attacker in order to enable capture of the cyber-attacker. In one example, the heuristic scaling rules 232 may be defined and modified by a customer via a user interface. The user interface may include a series of checkboxes and sliders for the customer to define the cyber-attack mitigation strategy and the types of security scaling actions to perform depending on the type of cyber-attack. In another example, the heuristic scaling rules 232 may be provided in a JavaScript Object Notation (JSON)-formatted policy. The heuristic scaling rules 232 may be defined and modified via an application programming interface (API) or a command line interface (CLI).

The server computer 210 may include a cyber-attack identification module 222, a time to defeat module 224, an auto scaling event selection module 226, an auto scaling event performance module 228, and other applications, services, processes, systems, engines, or functionality not discussed in detail herein. The cyber-attack identification module 222 may be configured to identify the computing resources 242 in the service provider environment 200 that are being subjected to the cyber-attack. The computing resources 242 may include particular classes of computing resources, such as storage resources, network resources, computing resources, data store resources, etc. In addition, the cyber-attack identification module 222 may identify a type of cyber-attack (e.g., a denial-of-service attack) being inflicted on the service provider environment 200. The computing resources 242 that are being subjected to the cyber-attack and the type of cyber-attack may be detected using a security threat detection system that operates in the service provider environment 200, and the security threat detection system may notify the cyber-attack identification module 222 of the computing resources 242 under attack and the type of cyber-attack that is being inflicted on the service provider environment 200.

The time to defeat module 224 may be configured to determine an expected amount of time before the computing resources 242 in the service provider environment 200 become compromised due to the cyber-attack. In other words, the time to defeat module 224 may determine a "time to defeat" or overwhelm the computing resources 242 that are under attack. The time to defeat module 224 may determine the expected amount of time based on the type of cyber-attack, the class of computing resource that are being attacked and/or a type of computing resource configuration in the service provider environment 200. A particular computing resource configuration may indicate that an operating system is strengthened using, for example, a bastion host. In addition, a particular resource configuration may indicate that the operating system is strengthened via an installation of a firewall, intrusion detection capabilities, etc. In one example, machine learning may be used to improve predictions on the expected amount of time before the computing resources 242 become compromised due to the cyber-attack. In other words, as the number of cyber-attacks that are launched in the service provider environment 200 accumulates over a period of time, the accuracy of the predictions on the expected amount of time before the computing resources 2425 become compromised may be improved by using machine learning or similar techniques. In one example, the time to defeat module 224 may recalculate the expected amount of time before the computing resources 242 become compromised after an auto scaling event is performed in the service provider environment 200 in order to mitigate the cyber-attack.

The auto scaling event selection module 226 may be configured to select an auto scaling event (or auto scaling events) to perform in the service provider environment 200 using the heuristic scaling rules 232 in order to mitigate the cyber-attack. In one configuration, the auto scaling event may include auto scaling out the computing resources 242 to mitigate the cyber-attack. The computing resources 242 may be auto scaled out when the cyber-attack mitigation strategy is to expel or block the cyber-attacker. The computing resources 242 may be auto scaled out in an amount of time that is less than the expected amount of time before the computing resources 242 become compromised. Accordingly, the computing resources 242 may be auto scaled out before being compromised by the cyber-attack.

Alternatively, the auto scaling event selection module 226 may select the auto scaling event (or auto scaling events) to perform in the service provider environment 200 using machine learning in order to mitigate the cyber-attack. Based on the type of cyber-attack and/or the class of computing resource that are being attacked, the auto scaling event selection module 226 may determine the auto scaling event to perform in view of previously performed auto scaling events in the service provider environment 200.

As a non-limiting example, after the cyber-attack is launched on the service provider environment 200, the computing resources 242 may be compromised in 20 seconds based on the type of cyber-attack. The auto scaling event selection module 226 may determine that auto scaling out the computing resources 242 is performable in 15 seconds, and where the heuristic scaling rules 232 that indicate that cyber-attacks are to be mitigated as soon as possible, the auto scaling event selection module 226 may determine to auto scale out the computing resources 242, such that the computing resources 242 do not become compromised due to the cyber-attack.

In another configuration, the auto scaling event selection module 226 may determine to scale in the computing resources 242 based on the heuristic scaling rules 232, thereby reducing an attack surface of the cyber-attacker. By scaling in the computing resources 242, the cyber-attacker may be limited to a particular area (e.g., fewer computing resources, computing instances or nodes), which may enable capture of the cyber-attacker. The computing resources 242 may be auto scaled in when the cyber-attack mitigation strategy is to quarantine the cyber-attacker. In this configuration, the computing resources 242 that are auto scaled in may be compromised by the cyber-attacker, which may increase a dwell time of the cyber-attacker in the service provider environment 200. The dwell time may refer to a period of time during which the cyber-attacker remains in the service provider environment 200 after overwhelming the computing resources 242 in the service provider environment 200. However, the increased dwell time of the cyber-attacker may allow additional time to notify an operator and/or capture of the cyber-attacker.

The auto scaling event performance module 228 may be configured to initiate performance of the auto scaling event in the service provider environment 200. For example, the auto scaling event performance module 228 may instruct an auto scaling service that operates in the service provider environment 200 to auto scale out or auto scale in the computing resources 242 in order to mitigate the cyber-attack. The auto scaling event performance module 228 may initiate the performance of the auto scaling event to occur immediately after the cyber-attack is detected, or alternatively, at a defined time after the cyber-attack is detected.

The client device 260 may be utilized by a customer to define the heuristic scaling rules 232. The client device 260 may include any device capable of sending and receiving data over the network 250. The client device 260 may comprise, for example a processor-based system such as a computing device. The client device 260 may be a device such as, but not limited to, a desktop computer, laptop or notebook computer, tablet computer, mainframe computer system, handheld computer, workstation, network computer, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
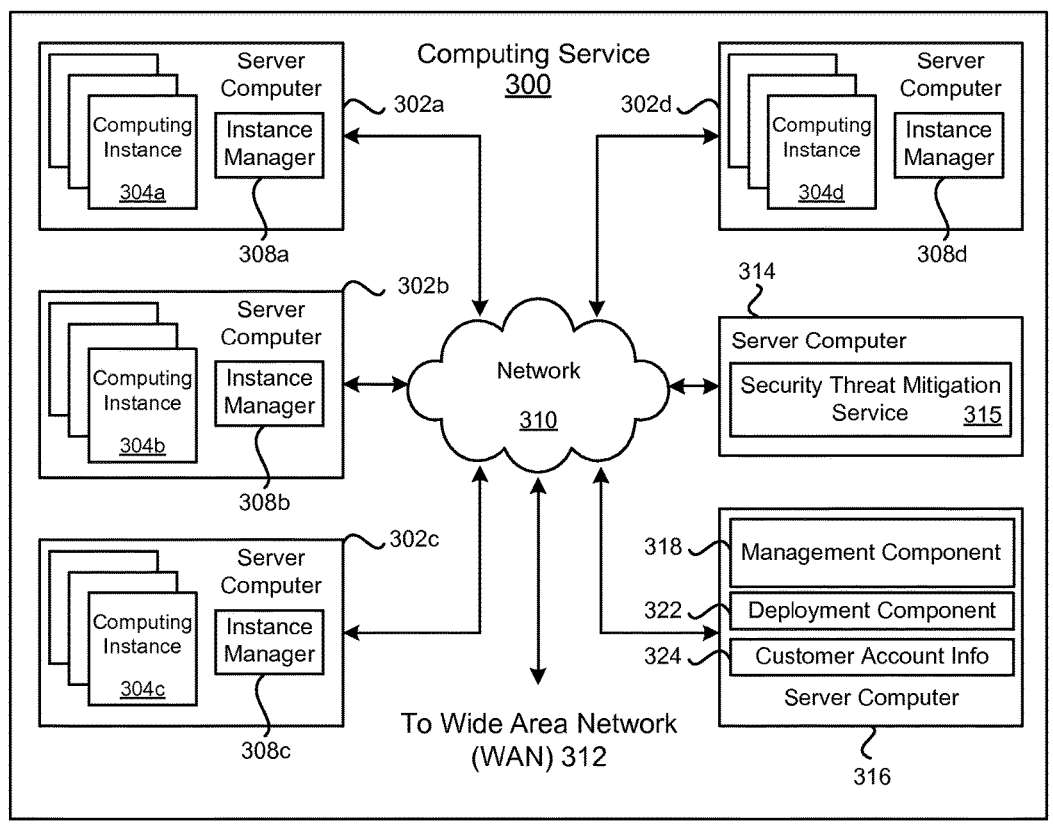
FIG. 3 is a block diagram of a computing service environment according to an example of the present technology.

FIG. 3 is a block diagram illustrating an example computing service 300 that may be used to execute and manage a number of computing instances 304a-d upon which the present technology may execute. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine manager (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for implementing the present technology or managing the operation of the computing service 300 and the computing instances 304a-d. For example, the server computer 314 may execute a security threat mitigation service 315. The security threat mitigation service 315 may operate through a control plane of the computing service 300 or as an independent service in the computing service 300. The security threat mitigation service 315 may identify the computing instances 304a-d in the computing service 300 that are being subjected to a cyber-attack. Further, the security threat mitigation service 315 may calculate an expected amount of time before the computing instances 304a-d in the computing service 300 become compromised due to the cyber-attack.

The security threat mitigation service 315 may select an auto scaling event to perform in the computing service 300 in order to mitigate the cyber-attack. An amount of time to perform the selected auto scaling event may be less than the expected amount of time before the computing instances 304a-d become compromised. A performance of the auto scaling event may be initiated in the computing service 300. The auto scaling event may include scaling out the computing instances 304a-d in the computing service 300 to cause the computing instances 304a-d to not be compromised in the expected amount of time, or the auto scaling event may include scaling in the computing instances 304a-d in order to reduce an attack surface in the computing service 300.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache is to be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
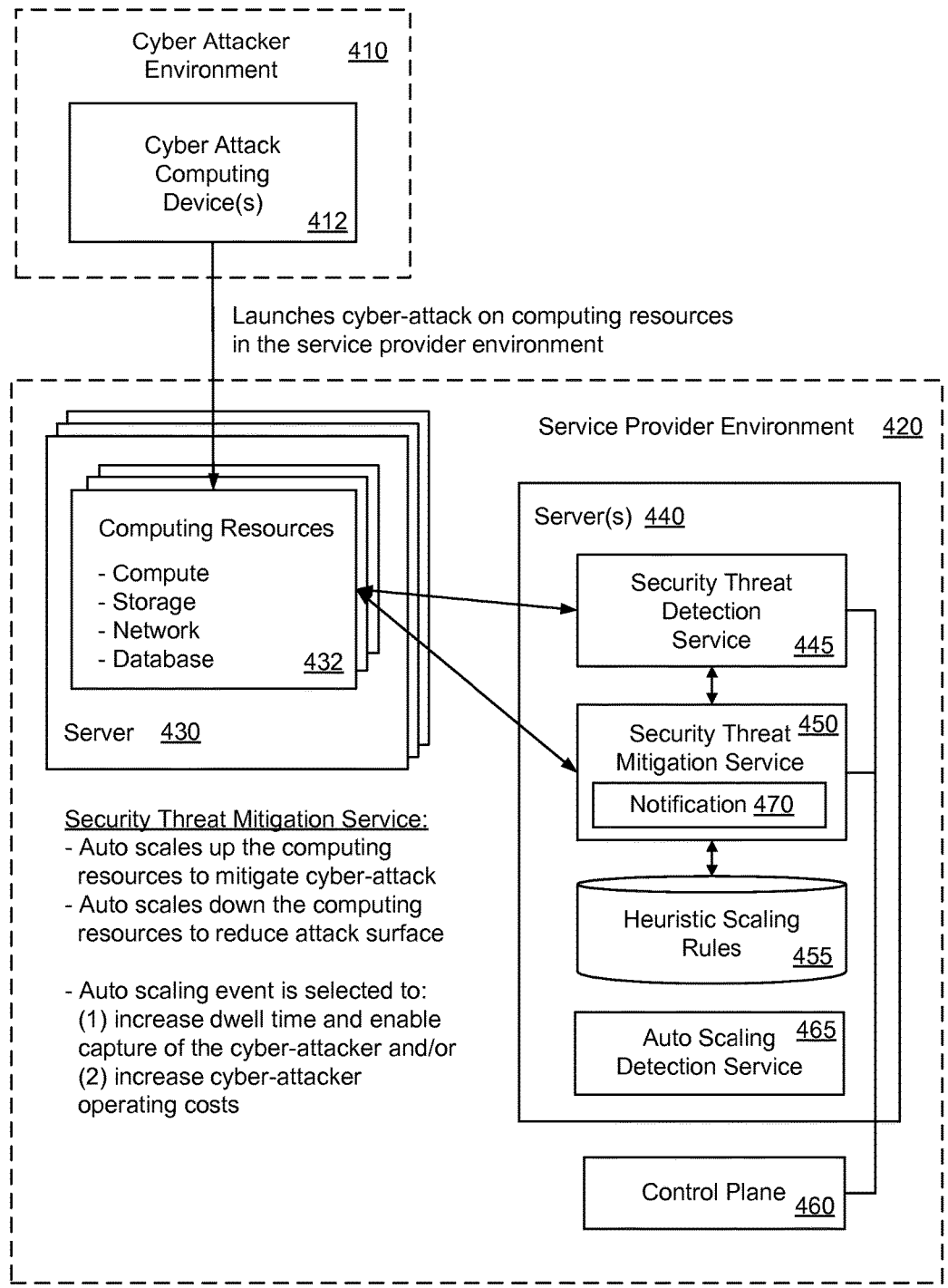
FIG. 4 illustrates a system and related operations for performing auto scaling events in response to a cyber-attack in a service provider environment according to an example of the present technology.

FIG. 4 illustrates an exemplary system for auto scaling computing resources 432 in response to a cyber-attack in a service provider environment 420. The computing resources 432 may operate on a server 430 in the service provider environment 420. The computing resources 432 may include classes of computing resources, such as storage resources, network resources, computing resources, data store resources, content delivery, security and identity, etc.

The cyber-attack may be launched from one or more cyber-attack computing devices 412 that operate in a cyber-attacker environment 410. As non-limiting examples, the cyber-attack may be a denial-of-service attack, a brute force attack, an unauthorized attempt to steal customer data, an attack to install a virus or malware in the service provider environment 420, a data store query injection attempt, buffer overflow attack, an unauthorized attempt to access the computing resources 432 for data processing, etc.

In one example, a security threat detection service 445 may detect a cyber-attack that is launched against computing resources 432 in the service provider environment 420, as well as a type of cyber-attack. For example, the security threat detection service 445 may detect a denial-of-service attack or unwanted traffic in the service provider environment 420. The security threat detection service 445 may detect signature-based attacks that involve malicious intrusions, malware, etc. The security threat detection service 445 may identify data packet patterns and/or perform deep packet inspection in order to detect the signature-based attacks. In addition, the security threat detection service 445 may identify host-based behavior, such as the behavior of applications or user traffic in the service provider environment 420. When the security threat detection service 445 detects malicious activity in the service provider environment 420, a threat alarm may be activated and the security threat detection service 445 may notify a security threat mitigation service 450 of the cyber-attack. More specifically, the security threat detection service 445 may notify the security threat mitigation service 450 that the computing resources 432 are under attack. The security threat detection service 445 and the security threat mitigation service 450 may operate on a server 440 in the service provider environment 420. In addition, the security threat detection service 445 and the security threat mitigation service 450 may operate through a control plane 460 of the computing service 400.

Based on heuristic scaling rules 455, the security threat mitigation service 450 may determine an auto scaling event to perform in order to mitigate the cyber-attack. The heuristic scaling rules 455 may indicate a cyber-attack mitigation strategy that is defined, for example, by a customer that is associated with the computing resources 432. The heuristic scaling rules 455 may indicate that cyber-attacks are to be mitigated by auto scaling out computing resources that are under attack. The heuristic scaling rules 455 may indicate that the auto scaling is to be performed, if possible, before the computing resources are compromised due to the cyber-attack. Alternatively, the heuristic scaling rules 455 may indicate that cyber-attacks are to be mitigated by auto scaling in the computing resources that are under attack to enable capture of a cyber-attacker.

In one configuration, the heuristic scaling rules 455 may be provided in a JavaScript Object Notation (JSON)-formatted policy. The heuristic scaling rules 455 may be defined and modified by a customer associated with computing resources 432 in the service provider environment 420. More specifically, the heuristic scaling rules 455 may be defined and modified via a user interface, an application programming interface (API) or a command line interface (CLI). The user interface may include a series of text entry boxes, checkboxes and sliders for the customer to define the cyber-attack mitigation strategy and the types of security scaling actions to perform. The security scaling actions to be performed (e.g., auto scaling in or auto scaling out) may be dependent on the type of cyber-attack, the type of computing resource that is attacked, and the expected amount of time for the computing resource under attack to be compromised.

Referring back to FIG. 4, based on the heuristic scaling rules 455, the security threat mitigation service 450 may determine to auto scale out the computing resources 432 (i.e., add additional computing resources). The auto scaling may cause the newly launched computing resources to have new physical characteristics, such as new media access control (MAC) identifiers, Internet Protocol (IP) addresses, etc. The security threat mitigation service 450 may auto scale out the computing resources 432 before the computing resources 432 become compromised due to the cyber-attack. In other words, the security threat mitigation service 450 may calculate an expected amount of time before the computing resources 432 become compromised due to the cyber-attack, and then the security threat mitigation service 450 may ensure that the computing resources 432 are auto scaled out before the computing resources 432 become compromised. The security threat mitigation service 450 may calculate the expected amount of time based on the type of cyber-attack, the class of computing resources 432 that are attacked (e.g., storage resources), etc. In addition, the security threat mitigation service 450 may calculate the expected amount of time based on an attack vector (and/or attack velocity) associated with the cyber-attack. The attack vector may provide a prediction of which computing resources 432 are likely to be attacked in the future, and based on the attack vector, the security threat mitigation service 450 may determine to auto scale out the computing resources 432. By auto scaling out the computing resources 432 before the computing resources 432 become compromised, a dwell time of a cyber-attacker may be reduced or eliminated. The dwell time may refer to a period of time during which the cyber-attacker remains in the service provider environment 420 after overwhelming the computing resources 432 in the service provider environment 420. In addition, by scaling out the computing resources 432 and mitigating the cyber-attack, the cyber attacker's cost to continue carrying out the cyber-attack may accumulate over time. After a defined period of time, the cyber attacker may expend their available resources and stop performing the cyber-attack.

As a non-limiting example, by auto scaling out (e.g., increasing) the computing resources 432, the expected amount of time before the computing resources 432 become compromised due to the cyber-attack may increase from approximately 3 minutes to approximately 7 minutes. This additional time may allow the security threat mitigation service 450 to perform a number of additional security actions in order to mitigate the cyber-attack, such as contacting law enforcement or a forensics team. As another example, the security threat mitigation service 450 may shut down an Internet gateway or virtual private network in order to mitigate the cyber-attack.

In one example, the security threat mitigation service 450 may determine to scale in or scale out the computing resources 432, or the security threat mitigation service 450 may determine to scale up or scale down the computing resources 432. When the computing resources 432 are scaled in or scaled out, similar resources are added or removed, respectively. For example, if the computing resources 432 are 4-core central processing units (CPUs), then scaling in or scaling out may comprise adding additional 4-core CPUs or removing 4-core CPUs. Conversely, when the computing resources 432 are scaled up or scaled down, resources of an alternative capacity may be added or removed, respectively. For example, if the computing resources 432 comprise 4-core CPUs, then scaling up or scaling down may comprise substituting the 4-core CPUs with 16-core CPUs or substituting the 4-core CPUs with 2-core CPUs, respectively.

In one example, security patches used to resist the cyber-attack may be applied to the computing resources 432 that are auto scaled out in the service provider environment 420. The security patch may be specifically designed to patch against an attack vector associated with the cyber-attack. Therefore, when the auto scaling event is performed, each additional computing resource that is added may be specifically patched to deal with the attack vector associated with the cyber-attack. In an alternative example, security wrappers may be used to resist the cyber-attack. As an example, the security wrapper may comprise of a small bit of code that is installed around or "in front of" an application programming interface (API), and the security wrapper may enable the security threat mitigation service 450 to handle a specific type of cyber-attack.

In an alternative configuration, based on the heuristic scaling rules 455, the security threat mitigation service 450 may determine to auto scale in the computing resources 432 (i.e., remove existing computing resources). Auto scaling in the computing resources 432 may reduce an attack surface in the service provider environment 420. By minimizing the attack surface, the security threat mitigation service 450 may create a choke point in the service provider environment 420 that enables capture of a cyber-attacker. In this example, the computing resources 432 that are auto scaled in may become compromised by the cyber-attacker, which may increase the dwell time of the cyber-attacker in the service provider environment. However, the security threat mitigation service 450 may permit the computing resources 432 to be compromised in order to increase a probability of capturing the cyber-attacker (i.e., capturing the identity or source location of the cyber-attacker). Thus, the heuristic scaling rules 455 may favor increased dwell times when the likelihood of capturing the cyber-attacker is increased.

In some cases, the security threat mitigation service 450 may increase the cyber attacker's dwell time for a variety of other reasons. For example, the security threat mitigation service 450 may not want to the cyber-attacker to learn that the cyber-attack was detected in the service provider environment 420. The security threat mitigation service 450 may increase the dwell time in order to contact a human operator or law enforcement. The security threat mitigation service 450 may increase the dwell time in order to prevent false positives, as the security threat mitigation service 450 does not want to accidentally expel a systems administrator that is trying to resolve the cyber-attack.

The expected amount of time before the computing resources 432 become compromised may be weighed against the dwell time of the cyber-attacker in the service provider environment 420. In other words, based on the cyber-attack mitigation strategy defined in the heuristic scaling rules 455, the security threat mitigation service 450 may determine to block the cyber-attacker by auto scaling out the computing resources 432 before the computing resources 432 become compromised. Alternatively, the security threat mitigation service 450 may determine to auto scale in the computing resources 432 and possibly permit the scaled-in computing resources 432 to become compromised, but since the cyber-attacker is quarantined in the service provider environment 420, the security threat mitigation service 450 may be enabled to capture the cyber-attacker with greater ease.

In one example, the security threat mitigation service 450 may perform an auto scaling event on the computing resources 432 under attack, such that the cyber-attacker loses their foothold in the service provider environment 420. As a result, the cyber-attacker may have to try to re-compromise other resources in the service provider environment 420. This strategy may be referred to as a moving target style of defense during which the cyber attacker's ability to move laterally in the service provider environment 420 is limited. In addition, the security threat mitigation service 450 may proactively control the dwell time of the cyber-attacker with respect to the computing resources 432 under attack by the cyber-attacker. By actively controlling the actions of the cyber-attacker, the security threat mitigation service 450 may be better equipped to combat and ultimately defeat the cyber-attacker.

In one configuration, the security threat mitigation service 450 may calculate a period of time for sustaining the performance of the auto scaling event. The security threat mitigation service 450 may calculate the period of time for sustaining auto scaling based on the type of cyber-attack, an estimated computing resource capacity of the cyber-attacker and an estimated computing resource capacity of the customer's environment in the service provider environment 420. The security threat mitigation service 450 may make an intelligent decision on whether or not it is feasible and/or reasonable to combat the cyber-attack until the cyber-attacker expends their available resources. As a non-limiting example, the security threat mitigation service 450 may determine or estimate that the cyber-attacker is equipped to carry out a 3-hour attack on the service provider environment 420. If the security threat mitigation service 450 determines that it is feasible and/or reasonable for the service provider environment 420 to combat the cyber-attacker for 3 hours, such that the cyber-attacker is likely to stop the cyber-attack after 3 hours (based on the cyber attacker's available resources), then the security threat mitigation service 450 may sustain the performance of the auto scaling event for the 3-hour period.

In one configuration, the security threat mitigation service 450 may send a 470 notification to an operator. The notification 470 may indicate the computing resources 432 that were attacked, the auto scaling event performed to mitigate the cyber-attack, etc. The security threat mitigation service 450 may send the notification 470 via a message queuing service that operates in the service provider environment 420. Alternatively, the message may be sent via email, instant messaging, SMS (simple messaging service) or other similar messaging services. The security threat mitigation service 450 may send the notification 470 in parallel with initiating the auto scaling event to be performed. In one example, while the auto scaling event is being performed, the security threat mitigation service 450 may receive a response from the operator, and based on the response, the security threat mitigation service 450 may determine to continue performing the auto scaling event or cease performing the auto scaling event. In another example, the security threat mitigation service 450 may notify other entities of the cyber-attack, such as law enforcement or a forensics team.

In one example, a service level agreement (SLA) may define a specific period of time in which the computing resources 432 are to withstand a cyber-attack. For example, the SLA may define a defined target time (e.g., 15 or 20 minutes). Therefore, the security threat mitigation service 450 may select auto scaling events, such that the auto scaling events increase the expected amount of time until the computing resources 432 become compromised to the defined target time, in accordance with the SLA.

In one configuration, the service provider environment 400 may detect, via an auto scaling detection service 465, when auto scaling events are performed with respect to a customer's computing resources 432. The auto scaling event may be indicative of a cyber-attack on the customer's computing resources 432. The auto scaling detection service 465 may identify the attack based on the computing resources 432 under attack, and calculate an expected amount of time until the cyber-attack is completed or successful, or reaches a critical mass or poses a threat of compromise to the customer's computing resources 432. In other words, rather than calculating the expected amount of time until the computing resources 432 become compromised, the auto scaling detection service 465 may calculate the expected amount of time before the cyber-attack is completed. Based on the expected amount of time before the cyber-attack is completed, the auto scaling detection service 465 may determine to throttle the customer's auto scaling event or shut down the customer's auto scaling event. For example, the auto scaling detection service 465 may detect that 20,000 computing instances were added to mitigate the cyber-attack, but the auto scaling detection service 465 may determine to throttle down the 20,000 computing instances to 1000 computing instances. Even though the expected amount of time to complete the cyber-attack may be 20 minutes when 20,000 computing instances are added as opposed to 1 minute when 1000 computing instances are added, the auto scaling detection service 465 may determine that the reduced time (i.e., 1 minute) may be sufficient to contact the account owner and/or an operator in the service provider environment.

Figure 5:
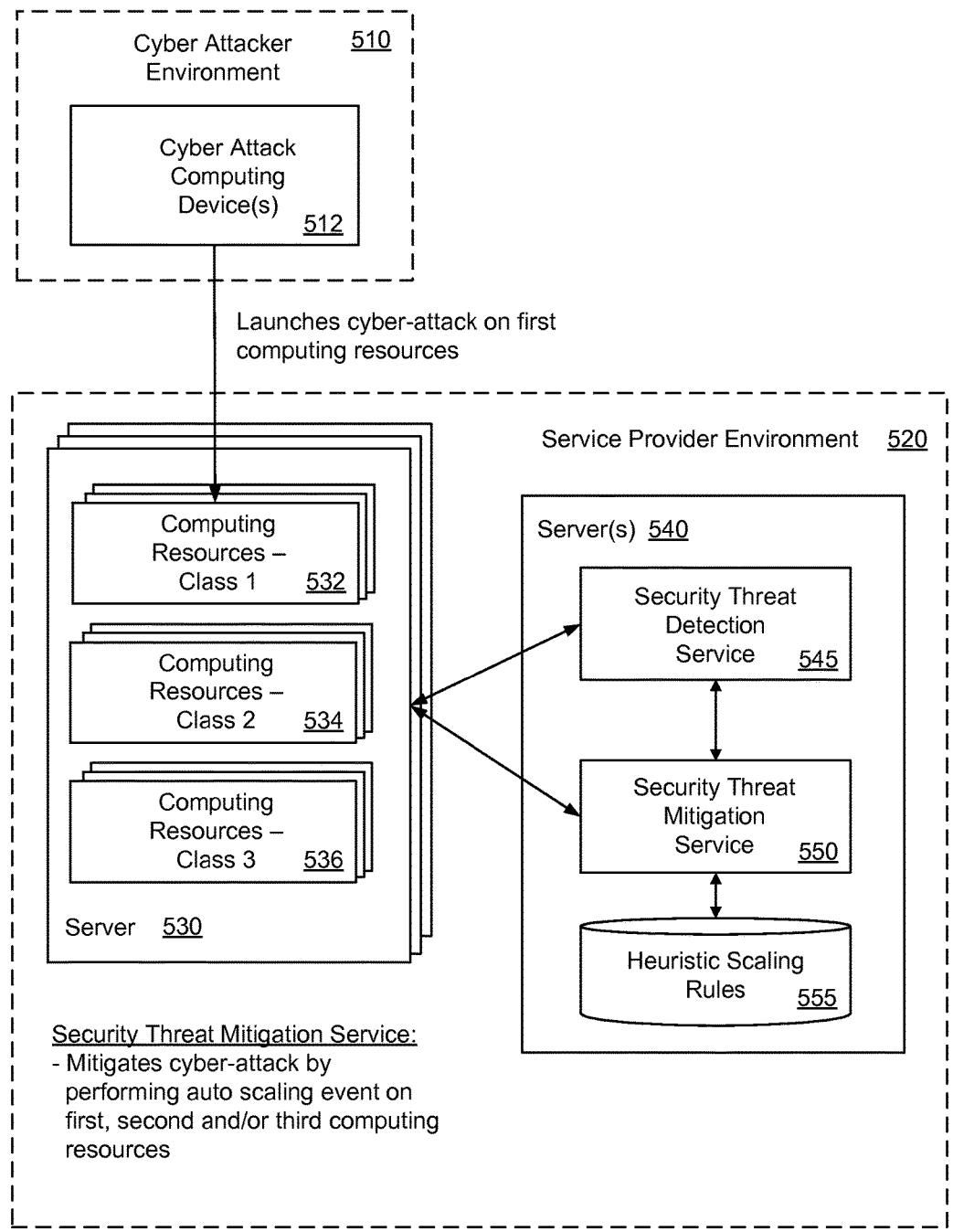
FIG. 5 illustrates a system and related operations for auto scaling one or more classes of computing resources in response to a cyber-attack in a service provider environment according to an example of the present technology.

FIG. 5 illustrates an exemplary system for auto scaling one or more classes of computing resources 532, 534, 536 in response to a cyber-attack in a service provider environment 520. The computing resources 532, 534, 536 may operate on a server 530 in the service provider environment 520. In one example, first computing resources 532 may be associated with a first resource class, second computing resources 534 may be associated with a second resource class, and third computing resources 536 may be associated with a third resource class. The resource classes may be related to storage resources, network resources, computing resources, data store resources, etc.

In one example, the cyber-attack may be launched from one or more cyber-attack computing devices 512 that operate in a cyber-attacker environment 510. A security threat detection service 545 may detect the cyber-attack that is launched in the service provider environment 520. In a more specific example, the security threat detection service 545 may detect that the first computing resources 532 are under attack. The security threat detection service 545 may notify a security threat mitigation service 550 that the first computing resources 532 are under attack. The security threat detection service 545 and the security threat mitigation service 550 may operate on a server 540 in the service provider environment 520.

The security threat mitigation service 550 may determine to auto scale out or auto scale in the first computing resources 532 depending on heuristic scaling rules 555. If the security threat mitigation service 550 determines to auto scale out the first computing resources 532, then the security threat mitigation service 550 may auto scale out the first computing resources 532 (i.e., add additional computing resources) before the first computing resources 532 become compromised due to the cyber-attack. If the security threat mitigation service 550 determines to auto scale in the first computing resources 532 (i.e., remove existing computing resources), then the first computing resources 532 may possibly become compromised due to the cyber-attack, but a likelihood of capturing the cyber-attacker may be increased due to a choke point created in the service provider environment 520 by auto scaling in the first computing resources 532.

Alternatively, based on an expected amount of time before the first computing resources 532 become compromised due to the cyber-attack, the security threat mitigation service 550 may determine to mitigate the cyber-attack by performing auto scaling on the second computing resources 534 and/or the third computing resources 536, even though the second computing resources 534 and the third computing resources 536 may not currently be under attack. For example, if the security threat mitigation service 550 is unable to perform auto scaling on the first computing resources 532 before the first computing resources 532 are overwhelmed by the cyber-attack, then the security threat mitigation service 550 may instead perform auto scaling on the second computing resources 534 and/or the third computing resources 536. The security threat mitigation service 550 may permit the first computing resources 532 to be compromised in order to protect the second computing resources 534 and/or the third computing resources 536. In this case, the security threat mitigation service 550 may determine that protecting the second computing resources 534 and/or the third computing resources 536 from a potentially upcoming cyber-attack is more valuable than saving the first computing resources 532.

In one example, the cyber attacker may attack and compromise the first computing resources 532 in a relatively fast amount of time. Then, the security threat mitigation service 550 may calculate an expected amount of time for the cyber-attacker to compromise the second computing resources 534 and the third computing resources 536 to be relatively low. However, based an attack vector (or attack velocity), the cyber attacker may spend an increased amount of time attacking the second computing resources 536. As a result, the expected amount of time for the second computing resources 534 and the third computing resources 536 may be increased, and therefore, the security threat mitigation service 550 may determine to perform an alternative auto scaling event for the third computing resources 536 compared to the planned auto scaling event due to the previous estimated amount of time.

As a non-limiting example, the security threat mitigation service 550 may identify a load balancer that is being attacked in the service provider environment 520. The security threat mitigation service 550 may calculate that the expected amount of time before the load balancer becomes compromised is 5 seconds. However, the security threat mitigation service 550 may determine that auto scaling out the load balancer will take 10 seconds. Therefore, the security threat mitigation service 550 may determine to not perform auto scaling on the load balancer, but rather to perform auto scaling on web servers that are positioned behind the load balancer of the service provider environment 520. Since the load balancer is in front of the web servers, adding additional computing resources to the web servers in the backend may mitigate the cyber-attack. More specifically, the heuristic scaling rules 555 may indicate to perform auto scaling on an alternative computing resource (e.g., the web servers) when the amount of time to perform the auto scaling on the computing resource under attack (i.e., the load balancer) is greater than the expected amount of time before the computing resource under attack is compromised.

As another non-limiting example, based on the heuristic scaling rules 555, the security threat mitigation service 550 may determine to auto scale out a first layer (e.g., the load balancer) such that user traffic may continue to be absorbed, and the security threat mitigation service 550 may auto scale in a second layer (e.g., the web servers) such that the cyber-attacker is given a single host to target during the cyber-attack.

As a further non-limiting example, based on the heuristic scaling rules 555, the security threat mitigation service 550 may determine to not perform auto scaling on either the load balancer or the web server, and instead may determine to perform auto scaling in another layer (e.g., an application layer) in the service provider environment 520.

As yet another non-limiting example, based on the heuristic scaling rules 555, the security threat mitigation service 550 may permit the load balancer to become compromised, and during this time, the security threat mitigation service 550 may auto scale out computing instances that are behind the load balancer in the service provider environment 520. Therefore, the cyber-attack mitigation strategy defined in the heuristic scaling rules 555 may not always be to save the computing resource that are under attack, but rather to make the most strategic decisions for the service provider environment 520 as a whole. As an example, the security threat mitigation service 550 may determine that permitting the load balancer to become compromised may be acceptable in order to increase robustness in the computing instances that are behind the load balancer in the service provider environment 520. In this case, a new load balancer may be launched after an original load balancer is compromised by the cyber-attacker.

As another non-limiting example, based on the heuristic scaling rules 555, the security threat mitigation service 550 may determine to auto scale out both the load balancer and the computing instances that are behind the load balancer in the service provider environment 520. Subsequently, some user traffic may be directed from the load balancer to the computing instances to relive some of the user traffic burden on the load balancer.

As illustrated in the numerous non-limiting examples above, based on the heuristic scaling rules 555, the security threat mitigation service 550 may make risk-based decisions on which layers to auto scale in and/or out in the architecture of the service provider environment 520 in order to best protect the service provider environment 520 from the cyber-attack.

Figure 6:
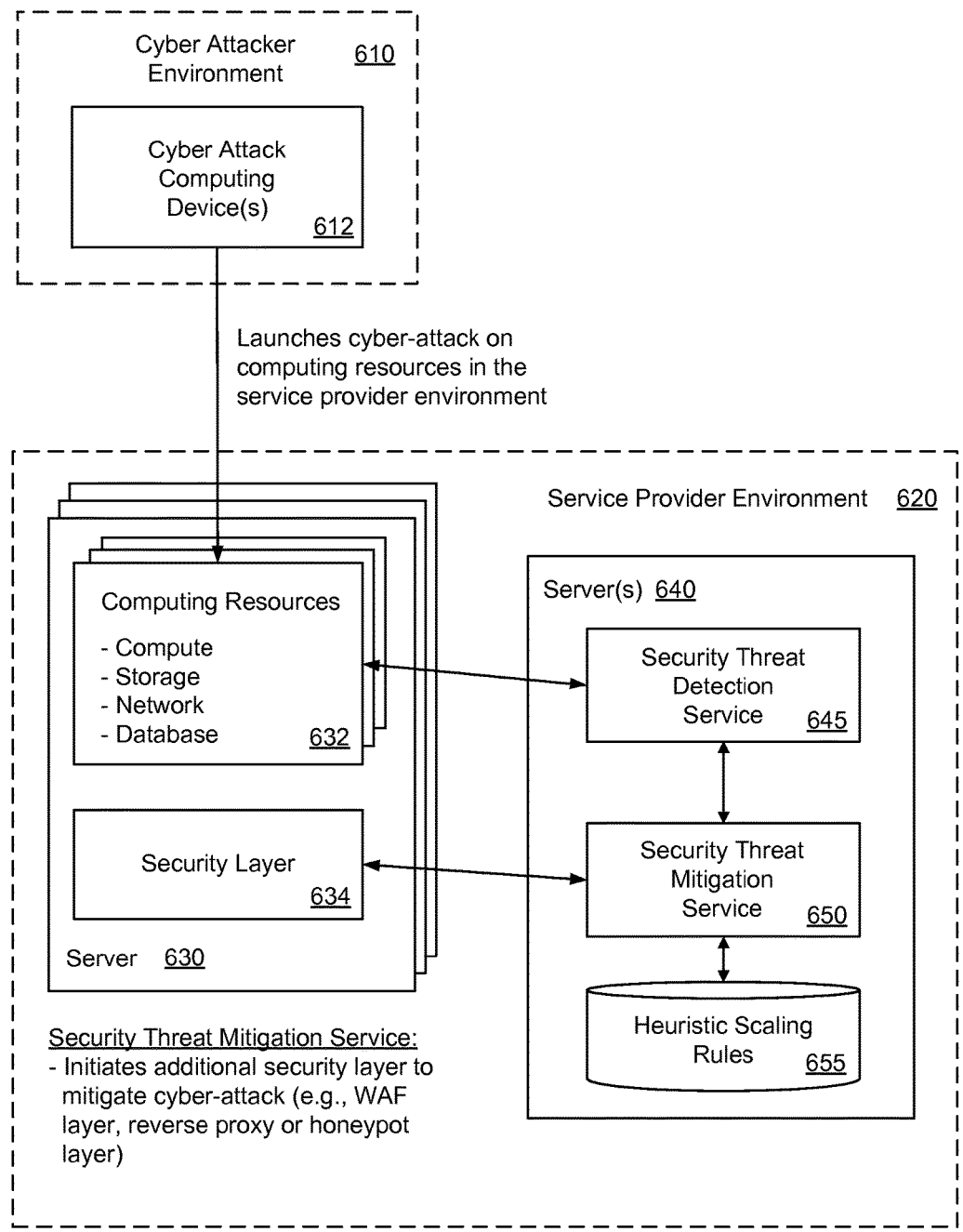
FIG. 6 illustrates a system and related operations for performing security scaling actions in response to a cyber-attack in a service provider environment according to an example of the present technology.

FIG. 6 illustrates an exemplary system for performing security scaling actions on computing resources 632 in response to a cyber-attack in a service provider environment 620. The computing resources 632 may operate on a server 630 in the service provider environment 620. The computing resources 632 may include classes of computing resources, such as storage resources, network resources, computing resources, data store resources, etc. The cyber-attack may be launched from one or more cyber-attack computing devices 612 that operate in a cyber-attacker environment 610. A security threat detection service 645 may detect when the computing resources 632 are being attacked. The security threat detection service 645 may notify a security threat mitigation service 650 that the computing resources 632 are under attack. The security threat detection service 645 and the security threat mitigation service 650 may operate on a server 640 in the service provider environment 620.

The security threat mitigation service 650 may select a security scaling action to be performed in the service provider environment 620 based on heuristic scaling rules 655. The heuristic scaling rules 655 may indicate preferred security scaling actions to be performed when the computing resources 632 are under attack. In one example, the security scaling actions to be performed may be dependent on an expected amount of time before the computing resources 632 become compromised due to the cyber-attack. For example, the heuristic scaling rules 655 may indicate to perform a first type of security scaling action when the expected amount of time is below a defined threshold, and the heuristic scaling rules 655 may indicate to perform a second type of security scaling action when the expected amount of time is above the defined threshold. In another example, the type of security scaling action to be performed may be dependent on the type of cyber-attack.

In one example, the security threat mitigation service 650 may determine to add a new security layer 634 in the service provider environment 620 in order to mitigate the cyber-attack. The security layer 634 may increase the security capabilities of the service provider environment 620, and as a result, the security layer 634 may cause the security threat mitigation service 650 to prevail over the cyber-attacker. The security layer 634 may include a reverse proxy to prevent a cyber-attacker from ex-filtrating data from the service provider environment 620. In other words, the reverse proxy may control outbound traffic and prevent data transfer out of the service provider environment 620 during the cyber-attack.

In another example, the security layer 634 may include a honeypot layer that enables capture or identification of the cyber-attacker. The honeypot layer may appear to be part of the service provider environment 620, but may be isolated from the service provider environment 620 and closely monitored by an operator of the service provider environment 620. In addition, the honeypot layer may appear to include computing resources with information that is valuable to the cyber-attacker, such that the cyber-attacker is tempted to try to infiltrate the computing resource. However, the cyber-attacker may be captured after attempting to infiltrate the computing resource, which is in fact the honeypot layer. Although the honeypot layer may result in an increased dwell time for the cyber-attacker, the increased dwell time may be justified if a likelihood of capturing the cyber-attacker is increased.

In another example, the security layer 634 may include a more robust web application firewall (WAF) layer. In one example, due to the relatively high cost associated with running the WAF layer, the security threat mitigation service 650 may determine to introduce the WAF layer when a certain level of compromise has been reached with respect to the computing resources 632 in the service provider environment 620. Thus, the WAF layer may be inserted in order to combat the cyber-attack for a defined period of time. After the cyber-attack has subsided or has been eliminated, the security threat mitigation service 650 may remove the WAF layer.

In another example, the security layer 634 may permit administrative control to become involved in combating the cyber-attack. For example, a layer of bastion hosts may be inserted to allow an administrator access to the service provider environment 620. The bastion hosts may enable the administrator to assess the cyber-attack and make decisions on additional security scaling actions to perform in order to combat the cyber-attack.

Figure 7:
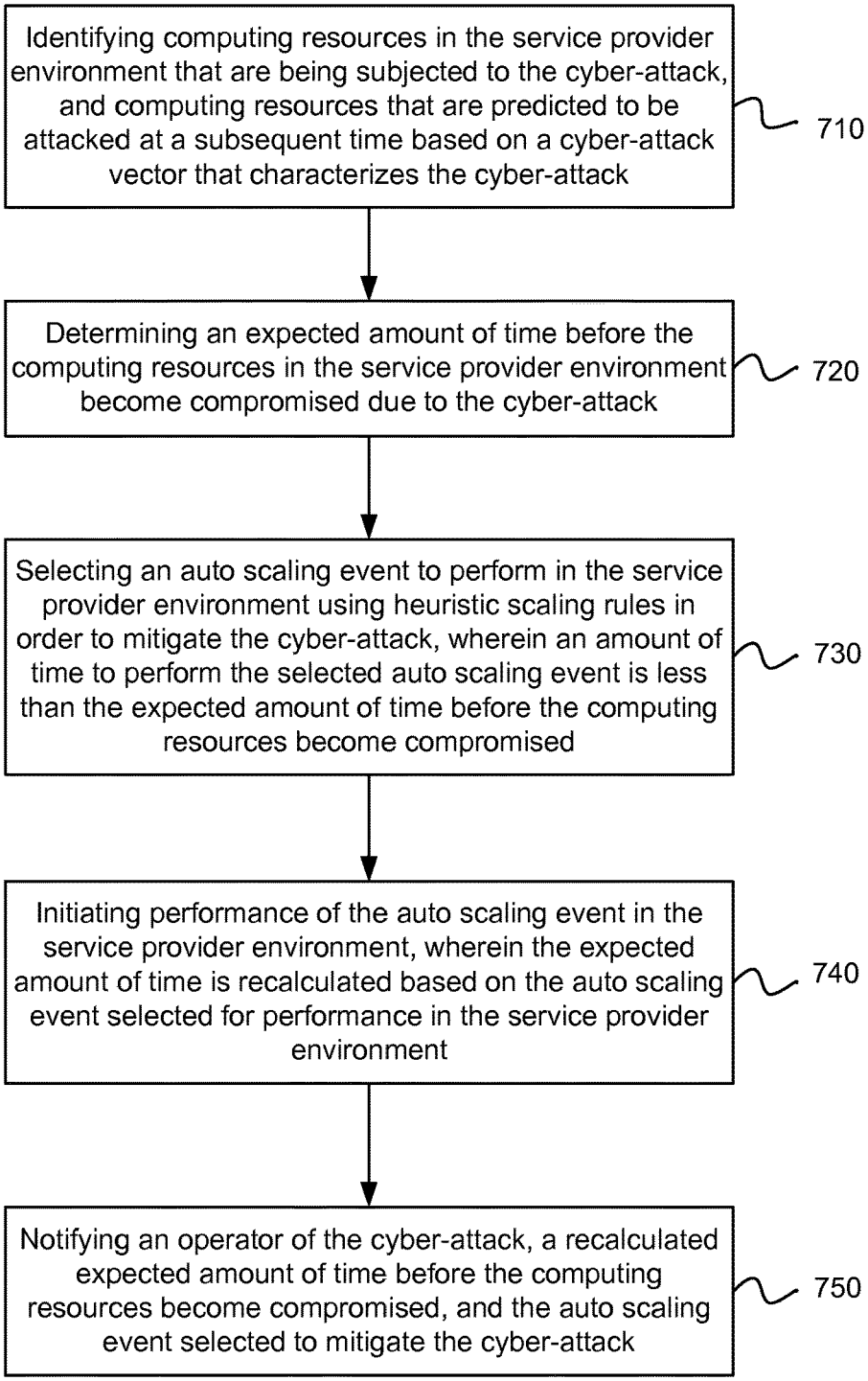
FIG. 7 is a flowchart of an example method for auto scaling computing resources in response to a cyber-attack in a service provider environment.

FIG. 7 illustrates an example of a method for auto scaling computing resources in response to a cyber-attack in a service provider environment. Computing resources that are being subjected to the cyber-attack may be identified in the service provider environment, as in block 710. In addition, computing resources may be identified that are predicted to be attacked at a subsequent time based on a cyber-attack vector that characterizes the cyber-attack. The computing resources may include particular classes of computing resources, such as storage resources, network resources, computing resources, data store resources, etc. The computing resources that are being subjected to the cyber-attack may be detected using a security threat detection system.

An expected amount of time before the computing resources in the service provider environment become compromised due to the cyber-attack may be determined, as in block 720. The expected amount of time before the computing resources become compromised may be determined based on at least one of: a type of cyber-attack, a class of computing resource that is being subjected to the cyber-attack or a type of computing resource configuration in the service provider environment. In one example, machine learning may be used to improve a determination of the expected amount of time before the computing resources become compromised due to the cyber-attack.

An auto scaling event may be selected to perform in the service provider environment in order to mitigate the cyber-attack, as in block 730. A type of auto scaling event to perform may be selected using heuristic scaling rules. An amount of time to perform the selected auto scaling event may be less than the expected amount of time before the computing resources become compromised. In other words, the selected auto scaling event may be performed before the computing resources become compromised.

A performance of the auto scaling event in the service provider environment may be initiated, as in block 740. The auto scaling event may include auto scaling out the computing resources in the service provider environment to cause the computing resources to not be compromised in the expected amount of time. Alternatively, the auto scaling event may include auto scaling in the computing resources in order to reduce an attack surface in the service provider environment. In addition, the expected amount of time may be recalculated based on the auto scaling event selected for performance in the service provider environment. In one example, the auto scaling event may be selected: for performance at a given time to increase a dwell time of a cyber-attacker in the service provider environment in order to enable capture of the cyber-attacker; or to increase a cost for the cyber-attacker to continue inflicting the cyber-attack in the service provider environment.

An operator may be notified of the cyber-attack, as in block 750. For example, a notification may be communicated to the operator that indicates a nature of the cyber-attack. In addition, the notification may be communicated to a customer associated with the computing resources that are under attack. In one example, the notification may include a calculated or recalculated expected amount of time before the computing resources become compromised, as well as the auto scaling event selected to mitigate the cyber-attack.

Figure 8:
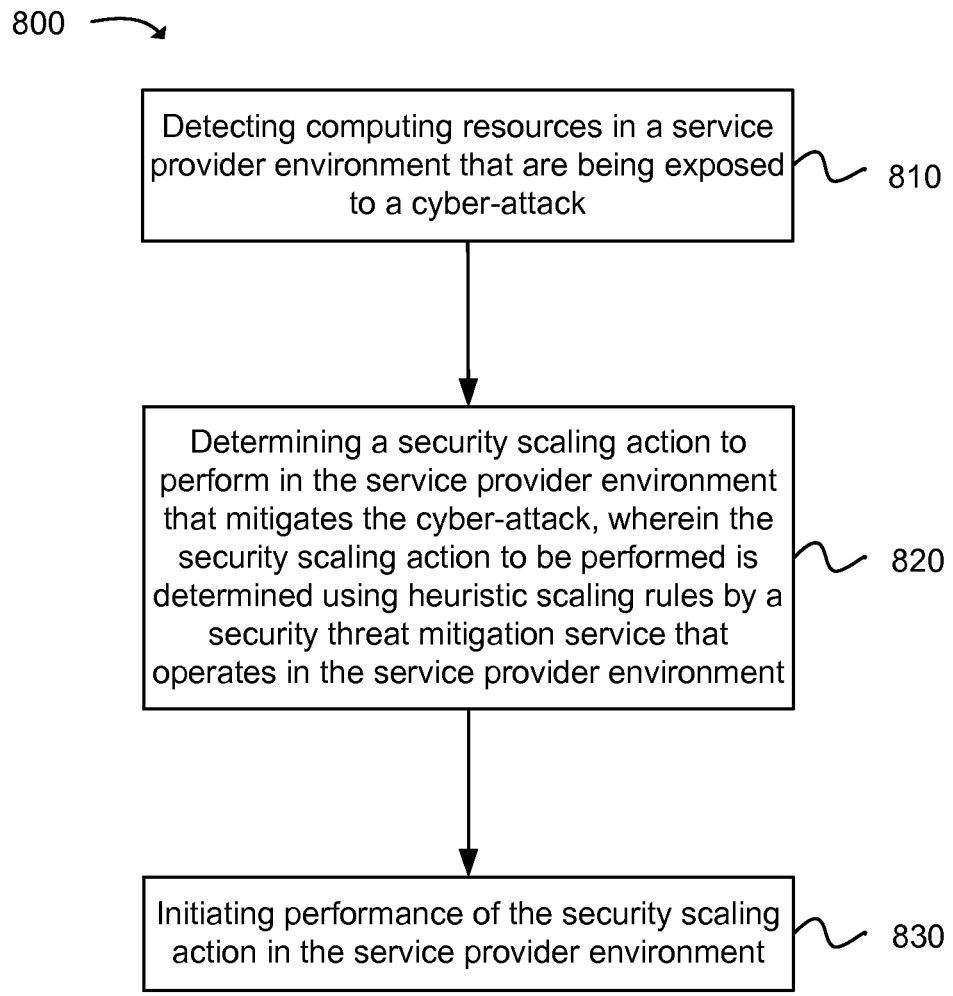
FIG. 8 is a flowchart of an example method for performing security scaling actions in a service provider environment.

FIG. 8 illustrates an example of a method for performing security scaling actions in a service provider environment. Computing resources in a service provider environment that are being exposed to a cyber-attack may be detected, as in block 810. The computing resources may include particular classes of computing resources, such as storage resources, network resources, computing resources, data store resources, etc. The computing resources that are being exposed to the cyber-attack may be detected using a security threat detection system.

A security scaling action to perform in the service provider environment that mitigates the cyber-attack may be determined, as in block 820. The security scaling action to be performed may be determined by a security threat mitigation service that operates in the service provider environment. A type of security scaling action to perform (e.g., auto scaling the computing resources, launching a new security layer, adding a reverse proxy) may be selected using heuristic scaling rules. In addition, the type of security scaling action may be selected in view of an expected amount of time before the computing resources become compromised due to the cyber-attack.

A performance of the security scaling action in the service provider environment may be initiated, as in block 830. A period of time for sustaining the performance of the security scaling action may be determined using heuristic scaling rules based on a type of cyber-attack, an estimated computing resource capacity of the cyber-attacker and an estimated computing resource capacity of the customer's environment in the service provider environment. In one example, an operator may be notified of the cyber-attack substantially in parallel with initiating the performance of the security scaling action. The operator may be notified via a message queuing service that operates in the service provider environment.

In one configuration, the performance of the security scaling action may include auto scaling out the computing resources in the service provider environment to mitigate the cyber-attack and decrease a dwell time of the cyber-attacker in the service provider environment. An amount of time to perform the auto scaling may be less than an expected amount of time before the computing resources become compromised due to the cyber-attack.

In one configuration, the performance of the security scaling action may include auto scaling out the computing resources in the service provider environment to mitigate the cyber-attack, and security patches used to resist the cyber-attack may be applied to the computing resources being auto-scaled in the service provider environment. In one configuration, the performance of the security scaling action may include auto scaling in the computing resources in order to reduce an attack surface in the service provider environment and create a choke point in the service provider environment that enables capture of the cyber-attacker.

In one configuration, the performance of the security scaling action may include auto scaling out or auto scaling in alternative computing resources to mitigate the cyber-attack based on an expected amount of time before the computing resources become compromised due to the cyber-attack, and the alternative computing resources are currently not under the cyber-attack. In one configuration, the performance of the security scaling action may include auto scaling out alternative computing resources that are currently not being exposed to the cyber-attack while permitting the computing resources that are being exposed to the cyber-attack to become compromised.

In one configuration, the performance of the security scaling action may include adding a security layer in the service provider environment to mitigate the cyber-attack, wherein the security layer includes a web application firewall (WAF) layer. In one example, the performance of the security scaling action may include adding a reverse proxy in the service provider environment to prevent data transfer out of the service provider environment during the cyber-attack.

In one configuration, the security scaling action performed in the service provider environment may be detected. A performance of the security scaling action may indicate an occurrence of the cyber-attack in the service provider environment. An expected amount of time for a cyber-attack to be completed in view of the security scaling action may be detected. A determination to throttle or shut down the security scaling event may be performed based on the expected amount of time for the cyber-attack to be completed.

Figure 9:
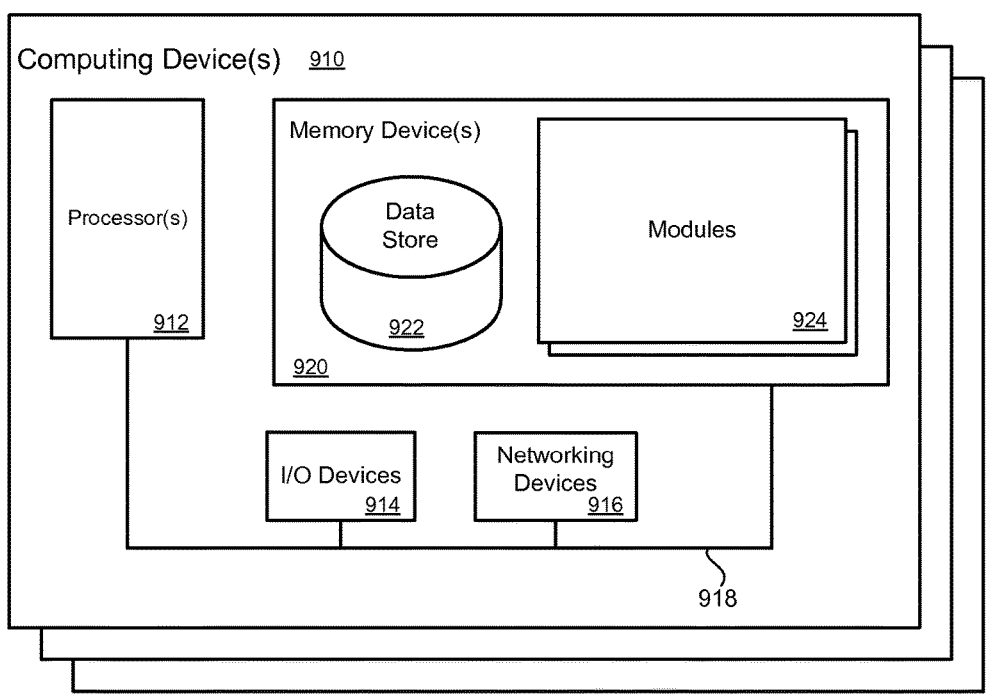
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for auto scaling computing resources in response to a cyber-attack in a service provider environment, the method comprising:

identifying computing resources in the service provider environment that are being subjected to the cyber-attack, and computing resources that are predicted to be attacked at a subsequent time based on a cyber-attack vector that characterizes the cyber-attack;

determining an expected amount of time before the computing resources in the service provider environment become compromised due to the cyber-attack;

selecting an auto scaling event to perform in the service provider environment using heuristic scaling rules in order to mitigate the cyber-attack, wherein an amount of time to perform the selected auto scaling event is less than the expected amount of time before the computing resources become compromised;

initiating performance of the auto scaling event in the service provider environment;

recalculating the expected amount of time before the computing resources become compromised based on the auto scaling event selected for performance in the service provider environment;

notifying an operator of the cyber-attack, along with a recalculated expected amount of time before the computing resources become compromised, and the auto scaling event selected to mitigate the cyber-attack;

detecting an expected amount of time for the cyber-attack to be completed in view of the auto scaling event performed in the service provider environment; and determining to throttle or shut down the auto scaling event performed to mitigate the cyber-attack based on the expected amount of time for the cyber-attack to be completed.

2. The method of claim 1, wherein the auto scaling event includes auto scaling out the computing resources in the service provider environment to cause the computing resources to not be compromised in the expected amount of time.

3. The method of claim 1, wherein the auto scaling event includes auto scaling in the computing resources in order to reduce an attack surface in the service provider environment.

4. The method of claim 1, wherein the auto scaling event is selected: for performance at a given time to increase a dwell time of a cyber-attacker in the service provider environment in order to enable capture of a cyber-attacker; or to increase a cost for the cyber-attacker to continue inflicting the cyber-attack in the service provider environment.

5. The method of claim 1, wherein the expected amount of time before the computing resources become compromised is determined based on at least one of: a type of cyber-attack, a class of computing resource that is being subjected to the cyber-attack or a type of computing resource configuration in the service provider environment.

6. The method of claim 1, further comprising: using machine learning to improve a determination of the expected amount of time before the computing resources become compromised due to the cyber-attack.

7. A computer-implemented method, comprising:

detecting computing resources in a service provider environment that are exposed to a cyber-attack;

determining a security scaling action to perform in the service provider environment that mitigates the cyber-attack, wherein the security scaling action to be performed is determined using heuristic scaling rules by a security threat mitigation service that operates in the service provider environment;

initiating performance of the security scaling action in the service provider environment;

detecting an expected amount of time for the cyber-attack to be completed in view of the security scaling action performed in the service provider environment; and determining to shut down the security scaling action performed to mitigate the cyber-attack based on the expected amount of time for the cyber-attack to be completed.

8. The method of claim 7, wherein the performance of the security scaling action includes auto scaling out the computing resources in the service provider environment to mitigate the cyber-attack and decrease a dwell time of a cyber-attacker in the service provider environment, wherein an amount of time to perform the auto scaling is less than an expected amount of time before the computing resources become compromised due to the cyber-attack.

9. The method of claim 7, wherein the performance of the security scaling action includes auto scaling out the computing resources in the service provider environment to mitigate the cyber-attack, wherein security patches used to resist the cyber-attack are applied to the computing resources being auto-scaled in the service provider environment.

10. The method of claim 7, wherein the performance of the security scaling action includes auto scaling in the computing resources in order to reduce an attack surface in the service provider environment and create a choke point in the service provider environment that enables capture of the cyber-attacker.

11. The method of claim 7, wherein the performance of the security scaling action includes:

auto scaling out or auto scaling in alternative computing resources to mitigate the cyber-attack based on an expected amount of time before the computing resources become compromised due to the cyber-attack, wherein the alternative computing resources are currently not under the cyber-attack; or auto scaling out alternative computing resources that are currently not exposed to the cyber-attack while permitting the computing resources that are being exposed to the cyber-attack to become compromised.

12. The method of claim 7, wherein the performance of the security scaling action includes adding a security layer in the service provider environment to mitigate the cyber-attack, wherein the security layer includes a web application firewall (WAF) layer.

13. The method of claim 7, wherein the performance of the security scaling action includes adding a reverse proxy in the service provider environment to prevent data transfer out of the service provider environment during the cyber-attack.

14. The method of claim 7, further comprising calculating a period of time for sustaining the performance of the security scaling action using heuristic scaling rules based on a type of cyber-attack, an estimated computing resource capacity of the cyber-attacker and an estimated computing resource capacity of a customer's environment in the service provider environment.

15. The method of claim 7, further comprising notifying an operator of the cyber-attack substantially in parallel with initiating the performance of the security scaling action, wherein the operator is notified via a message queuing service that operates in the service provider environment.

16. A system for auto scaling computing resources in response to a cyber-attack in a service provider environment, the system comprising:

a processor;

a memory device including a data store to store a plurality of data and instructions that, when executed by the processor, cause the processor to:

identify computing resources in the service provider environment that are being subjected to the cyber-attack and computing resources that are expected to be subjected to the cyber-attack, the computing resources including a class of computing resources;

determine an expected amount of time before the class of computing resources in the service provider environment become compromised due to the cyber-attack, wherein the expected amount of time is determined based on a type of cyber-attack and the class of computing resources that are being subjected to the cyber-attack;

select an auto scaling event to perform in the service provider environment in order to mitigate the cyber-attack, wherein an amount of time to perform the selected auto scaling event is less than the expected amount of time before the class of computing resources become compromised, wherein the expected amount of time is recalculated based on the auto scaling event selected for performance in the service provider environment;

initiate performance of the auto scaling event in the service provider environment;

detect an expected amount of time for the cyber-attack to be completed in view of the auto scaling event performed in the service provider environment; and determine to throttle or shut down the auto scaling event performed to mitigate the cyber-attack based on the expected amount of time for the cyber-attack to be completed.

17. The system of claim 16, wherein the auto scaling event includes at least one of:

auto scaling out the class of computing resources in the service provider environment to cause the class of computing resources to not be compromised in the expected amount of time;

auto scaling in the class of computing resources in order to reduce an attack surface in the service provider environment;

auto scaling up computing resources in the service provider environment; or auto scaling down computing resources in the service provider environment.

18. The system of claim 16, wherein the plurality of data and instructions, when executed by the processor, cause the processor to: notify an operator of the cyber-attack substantially in parallel with initiating the performance of the auto scaling event, wherein the operator is notified via a message queuing service that operates in the service provider environment.

19. The system of claim 16, wherein the auto scaling event is selected: for performance at a given time to increase a dwell time of a cyber-attacker in the service provider environment in order to enable capture of the cyber-attacker; or to increase a cost for the cyber-attacker to continue inflicting the cyber-attack in the service provider environment.

* * * * *